United States Patent [19]
Häberle et al.

[11] Patent Number: 5,338,077
[45] Date of Patent: Aug. 16, 1994

[54] FASTENING OF A STRIP TO A REARWARDLY ACCESSIBLE CARRIER PART

[75] Inventors: Fritz Häberle, Sindelfingen; Horst Kleiner, Stuttgart; Josef Oravetz, Sindelfingen, all of Fed. Rep. of Germany

[73] Assignee: Mercedes-Benz AG, Fed. Rep. of Germany

[21] Appl. No.: 74,294

[22] Filed: Jun. 9, 1993

[30] Foreign Application Priority Data

Jun. 18, 1992 [DE] Fed. Rep. of Germany ....... 4219944

[51] Int. Cl.⁵ ............................................. B60R 19/02
[52] U.S. Cl. ..................................... 293/120; 293/155
[58] Field of Search ................ 293/120, 126, 142, 155

[56] References Cited

U.S. PATENT DOCUMENTS

| | | | |
|---|---|---|---|
| 4,385,779 | 5/1983 | Kimura et al. | 293/120 X |
| 4,474,395 | 10/1984 | Harloff et al. | 293/120 |
| 4,826,226 | 5/1989 | Klie et al. | 293/120 |
| 5,169,189 | 12/1992 | Haberle et al. | 293/120 X |

FOREIGN PATENT DOCUMENTS 0150804 11/1990 European Pat. Off. .
2751158 5/1979 Fed. Rep. of Germany .

*Primary Examiner*—Joseph D. Pape

[57] ABSTRACT

A fastening of a strip to a rearwardly accessible carrier part has arranged opposite one another on the longitudinal edges of the strip, pairs of holding tongues which are inserted through long holes arranged in the carrier part. At their free ends, the holding tongues are provided on the sides facing one another with respective hooks which themselves have a clamping face extending approximately parallel to the rear side of the carrier part. Arranged on the rear side of the carrier part for each pair of holding tongues is a double-winged rotary bolt which is pivotable about an axis of rotation perpendicular to the rear side and arranged between the respective mutually opposite pair of long holes. To lock the strip, the wings are pivoted inwards with their end regions between the rear side of the carrier part and the clamping faces of the hooks on the holding tongues, so as bear tautly against the clamping faces.

5 Claims, 2 Drawing Sheets

5,338,077

FASTENING OF A STRIP TO A REARWARDLY ACCESSIBLE CARRIER PART

BACKGROUND AND SUMMARY OF THE INVENTION

The present invention relates to a fastening of a strip to a rearwardly accessible carrier part.

German Patent Document 2,751,158 discloses an endpiece for fastening an anti-ram strip to a vehicle body, in which there is inserted at the end of the antiram strip, rectangular in cross-section and having a longitudinal slot, a tenon of an endpiece, of which the cap arranged on the end face encloses the anti-ram strip completely on the outer circumference. Arranged in the tenon itself is a long hole extending in the push-in direction of the tenon. Inserted into the long hole from the rear side of a panel part of the body is a holding pin which, at its outer end facing the strip, has two diametrically projecting holding tongues which engage behind the tenon within the clear space of the anti-ram strip. A head is arranged on the rear end of the holding pin, so that, when the holding pin inserted into the long hole of the tenon is rotated, a clamping of the tenon between the head and the holding tongues of the holding pin and consequently of the anti-ram strip against the panel part becomes possible. However, this type of fastening is advantageous only in narrow anti-ram strips, since the force necessary for the clamping rotation of the holding pin otherwise becomes too great. Furthermore, if only a small free space which can be used for assembly is available in the region of the head of the holding pin, for example on account of constructional parts which follow at the rear, then the holding pin can be rotated hardly at all or only under difficult conditions. Moreover, the outlay for the fastening in terms of assembly and the corresponding dismounting is high, since it comprises a large number of individual parts.

European Patent Specification 150,804 discloses a fastening of an anti-ram strip made of plastic, which, in its cross-section, has a centrally arranged guiding and fastening strip of T-shaped clear cross-section. The cross-section of the guiding strip corresponds to that of the anti-ram strip previously described. Arranged displaceably in the guiding strip of this anti-ram strip are heads of fastening screws which are inserted through a bore arranged in the panel part and which are screwed to the rear side of the panel part. However, metallic constructional parts which are therefore susceptible to rust are used for this. Furthermore, where thin-walled anti-ram strips injection-molded from plastic are concerned, small indentations form on their visible side in the region of attachment of the guiding strip to the anti-ram strip, and these impair the appearance of the anti-ram strip and, where appropriate, have to be hidden. Also, the outlay in terms of assembly and the time required are high, since the threads have to be laboriously slipped in and the screws tightened.

An object of the present invention is to develop a fastening which allows a simple assembly and dismounting of a thin-walled strip injection-molded from plastic, which permits a tolerance compensation of the strip, at least in its direction of extension, and a flush gap-free fastening of high holding force, while for fastening purposes the strip does not have to be provided with material appendages which are either apparent (or are so placed as to become apparent) on the front side in the form of material indentations.

This and other objects are achieved by the present invention which provides a fastening arrangement of a strip to a rearwardly accessible carrier part, comprising long holes in the carrier part, and at least one pair of holding tongues which are arranged opposite one another on longitudinal edges of the strip. Each holding tongue is insertable through an associated one of the long holes so as to extend beyond a rear side of the carrier part. The holding tongues have free ends with sides facing one another and hooks. These hooks have clamping faces that extend approximately parallel to the rear side of the carrier part. The long holes have a longitudinal extension in a longitudinal direction of the strip that is longer than a corresponding width of the holding tongues. An overall distance between a pair of mutually opposite holding tongues corresponds to a distance between outer edges of two of the associated long holes. A clearance width of the long holes, as measured transversely to the longitudinal extension, is larger than or equal to a corresponding largest outer dimension of the individual holding tongues including the hook. The arrangement further comprises at least one double-winged rotary bolt arranged on the rear side of the carrier part and assigned to the pair of holding tongues. The rotary bolt is pivotable about an axis of rotation perpendicular to the rear side and arranged between a respective mutually opposite pair of long holes. The rotary bolt has wings that are pivotable inwards with end regions between the rear side of the carrier part and the clamping faces of the hooks on the holding-tongues so as to bear tautly against the clamping faces.

Interlocking takes place by means of the holding tongues, arranged on the longitudinal edges of the strip, and the rotary bolt, subjected radially to a pivoting force, on the rear side of the carrier part. The strip can consequently be produced with a virtually uniform wall thickness and therefore without irregularities or material indentations on the visible side, this being advantageous in thin-walled strips injection-molded from plastic. At the same time, the holding tongues located at the edge, in conjunction with the long holes arranged in the carrier part, allow a large tolerance width in the direction of extension of the long holes and a simple assembly, since the holding tongues can be introduced into the long holes without much effort. Furthermore, the dimensions of the holding tongues and of the long holes are selected so that the strip bears flush against the carrier part in a gap-free manner and with a high holding force. Moreover, a further simplification of assembly and dismounting is obtained by means of the rotary bolt which can be subjected to a radial pivoting force and which can at the same time pivot inwards under the respective clamping face of the hooks of mutually opposite holding tongues, thereby engaging behind the clamping faces with a clamping effect and pressing them inwards, with the result that the strip is pressed against the carrier part. The space required between a possibly following constructional part and the rear surface of the carrier part can thus be restricted to the diameter of a part initiating the pivoting movement or to the transverse distance of the holding tongue from the rear side of the carrier part.

Other objects, advantages and novel features of the present invention will become apparent from the following detailed description of the invention when considered in conjunction with the accompanying drawings.

DETAILED DESCRIPTION OF THE DRAWINGS

Figure 1:
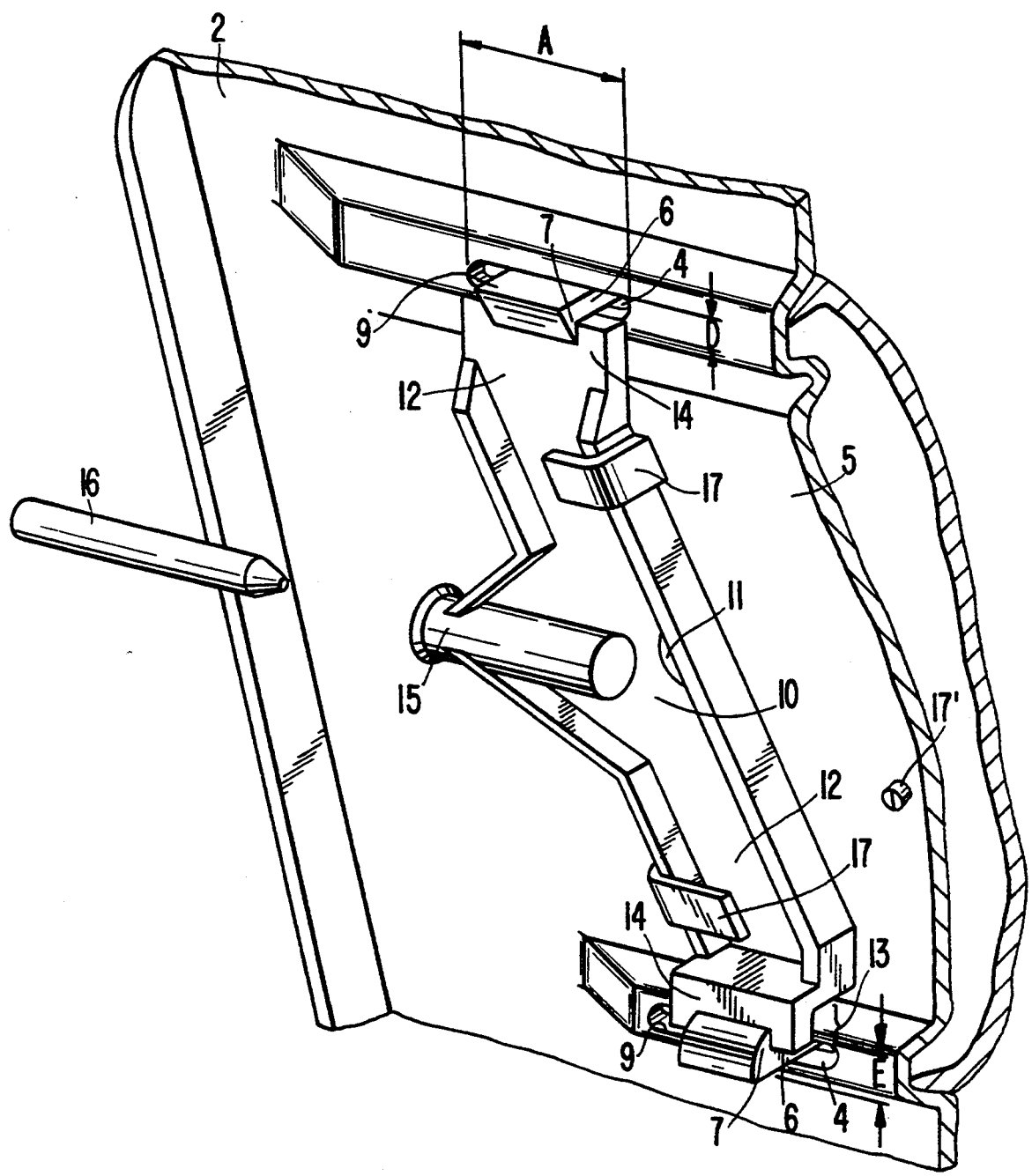
FIG. 1 shows a perspective view of a fastening constructed accordance with an embodiment of the present invention.
Figure 2:
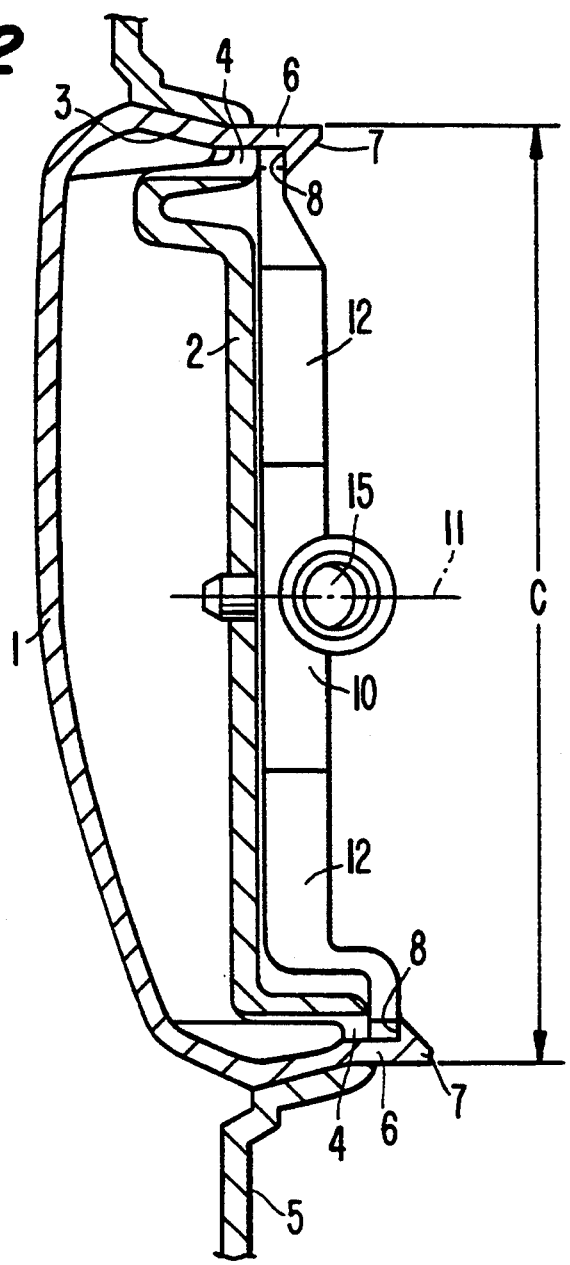
FIG. 2: shows a cross-section of the fastening according to FIG. 1.

FIG. 1 is a perspective view of a strip 1 constructed in accordance with an exemplary embodiment of the present invention. The strip is designed as an anti-ram strip and is fastened to a rearwardly accessible motor-vehicle bumper forming the carrier part 2. Arranged opposite one another on the longitudinal edges 3 of the strip 1 are holding tongues 6 which are provided at their free ends with hooks 7 facing one another. The hooks 7 themselves have clamping faces 8 which are arranged facing the carrier part 2 and which extend approximately parallel to the rear side 5 of the carrier part 2.

For fastening the strip 1 to the carrier part 2, the holding tongues 6 are inserted through long holes 4 provided in the carrier part 2 and extending in the longitudinal direction of the strip 1 and which are assigned to respective holding tongues 6. In the fully inserted state, the holding tongues 6 extend beyond the rear side 5 of the carrier part 2. So that a simple introduction of the hooks 7 arranged on the holding tongues 6 into the long holes 4 becomes possible and, furthermore and to make the long holes 4 invisible from outside, the individual constructional parts have the following dimensions:

a) as measured in the longitudinal direction of the strip 1, the long holes 4 are longer than the corresponding width A of the holding tongues 6;

b) the overall distance B between the respective pair of mutually opposite holding tongues 6 corresponds to the distance C between the outer edges 9 of two associated long holes 4; and c) the clearance width D of a long hole 4, as measured in the direction of the overall distance B, is larger than or equal to the corresponding largest outer dimension E of an individual holding tongue 6 including hook 7.

Figure 3:
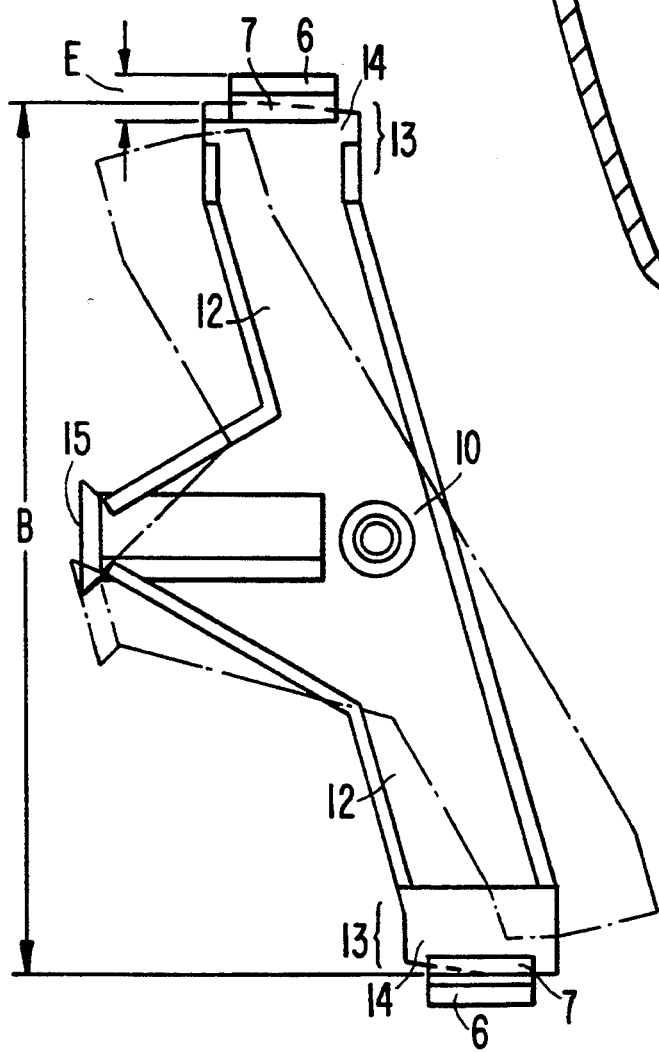
FIG. 3 shows a top view through the rotary bolt of the fastening according to FIG. 1.

The fastening has, for each pair of holding tongues 6, a double-winged rotary bolt 10 (see FIG. 3) which is arranged on the rear side 5 of the carrier part 2 and which is pivotable about an axis of rotation 11 perpendicular to the rear side 5 and arranged between the respective mutually opposite pair of long holes 4. The wings 12 of the rotary bolt 10 can pivot inwards with their end regions 13 between the rear side 5 of the carrier part 2 and the clamping faces 8 of the hooks 7 on the holding tongues 6. A tolerance compensation and a taut bearing of the end regions 13 against the clamping faces 8 is needed in the direction of extension of the holding tongues 6, (that is to say transversely to the clamping faces 8). To this end, the bearing faces, opposite the clamping faces 8, of the end regions 13 and the wings 12 are expediently at a distance from the rear side 5 of the carrier part 2 which corresponds at least to the maximum tolerance-related distance of the clamping faces 8 from the rear side 5.

To allow the end regions 13 of the rotary bolt 10 to pivot inwards under the clamping faces 8 of the hooks 7 in a simple way, it is advantageous to provide the end regions 13 with a run-on face 14 at the edge located at the front in the interlocking pivoting direction.

It is of particular advantage, at the same time, to select the distance of the starting edge of the runon face 14 in such a way that it is at a shorter distance from the rear side 5 than the minimum tolerance-related distance between the clamping faces 8 and the rear side 5.

The transfer of the rotary bolt 10 into its blocking position is carried out in an easy way by means of a pivoting tool 16 which is inserted into an insertion orifice 15 arranged radially relative to the pivot axis 11 of the rotary bolt 10.

Since the fastening is always subject to vibration, especially when used on motor vehicles, it is expedient to secure the rotary bolt 10 against unintentional release in its closing position by a releasable interlock.

The fastening of the strip 1 to the carrier part 2 therefore takes place by an interlocking of the holding tongues 6 arranged on the longitudinal edges 3 of the strip 1 with the rotary bolt 10 which is arranged on the rear side of the carrier part 5 and which can be subjected radially to a pivoting force. Furthermore, as explained above, the constructional design of the rotary bolt 10 allows a tolerance compensation not only in the direction of extension of the strip 1, but also in the direction of extension of the holding tongues 6, thereby making it possible to produce the strip more cheaply. A high production accuracy is consequently needed only in the direction of the overall distance B between the pairs of holding tongues 6, which can be implemented relatively simply; this accurate production relates to the long holes 3 and to the strip 1.

As regards the distance C between the outer edges 9 of the long holes 4, a tolerance compensation is also possible if the length of the rotary bolt 10 is selected to be larger than the distance between a pair of holding tongues 6.

It is expedient, furthermore, for the rotary bolt 10 to be assigned, both in the open position and in the blocking position, a blocking stop 17 and an open stop 17', so that the rotary bolt 10 cannot be pivoted at random. It has proved advantageous, here, to have the pivoting travel restricted to 15°, since the possibility of easy access for the rotary tool 16 is afforded thereby.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A fastening arrangement of a strip to a rearwardly accessible carrier part, comprising:

long holes in the carrier part; and at least one pair of holding tongues which are arranged opposite one another on longitudinal edges of the strip, each holding tongue being insertable through an associated one of the long holes so as to extend beyond a rear side of the carrier part, the holding tongues having free ends with sides facing one another and hooks, said hooks having clamping faces extending approximately parallel to the rear side of the carrier part;

wherein the long holes have a longitudinal extension in a longitudinal direction of the strip that is longer than a corresponding width of the holding tongues;

wherein an overall distance between a pair of mutually opposite holding tongues corresponds to a distance between outer edges of two of the associated long holes; and wherein a clearance width of the long holes as measured transversely to the longitudinal extension, is larger than or equal to a corresponding largest outer dimension of the individual holding tongues including the hook;

and further comprising at least one double-winged rotary bolt arranged on the rear side of the carrier part and assigned to the pair of holding tongues, the rotary bolt being pivotable about an axis of rotation perpendicular to the rear side and arranged between a respective mutually opposite pair of long holes, the rotary bolt having wings that are pivotable inwards with end regions between the rear side of the carrier part and the clamping faces of the hooks on the holding tongues so as to bear tautly against the clamping faces.

2. A fastening arrangement for a strip according to claim 1, wherein the end region of the wings of the rotary bolt has a run-on face at an edge located in front in an interlocking pivoting direction.

3. A fastening arrangement for a strip according to claim 1, further comprising a releasable interlock that secures the rotary bolt against release when the rotary bolt is in a closing position.

4. A fastening arrangement for a strip according to claim 1, wherein the rotary bolt has an insertion orifice, arranged radially relative to a pivot axis of the rotary bolt, adapted to receive a pivoting tool to be inserted radially.

5. A fastening arrangement for a strip according to claim 1, wherein the strip is an anti-ram strip and the carrier part is at least one of a bumper and a deflector plate of a motor vehicle.

* * * * *